US012160512B2

United States Patent
Amiet et al.

(10) Patent No.: US 12,160,512 B2
(45) Date of Patent: Dec. 3, 2024

(54) INCREMENTAL ASSESSMENT OF INTEGER DATASETS

(71) Applicant: NAGRAVISION SÀRL, Cheseaux-sur-Lausanne (CH)

(72) Inventors: Nils Amiet, Cheseaux-sur-Lausanne (CH); Yolan Romailler, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 805 days.

(21) Appl. No.: 17/259,410

(22) PCT Filed: Jul. 12, 2019

(86) PCT No.: PCT/EP2019/068845
§ 371 (c)(1),
(2) Date: Jan. 11, 2021

(87) PCT Pub. No.: WO2020/011987
PCT Pub. Date: Jan. 16, 2020

(65) Prior Publication Data
US 2021/0258159 A1     Aug. 19, 2021

(30) Foreign Application Priority Data

Jul. 13, 2018    (EP) .................................... 18183549

(51) Int. Cl.
*H04L 9/30*       (2006.01)
*G06F 16/23*      (2019.01)

(52) U.S. Cl.
CPC .......... *H04L 9/302* (2013.01); *G06F 16/2379* (2019.01)

(58) Field of Classification Search
None
See application file for complete search history.

(56) References Cited

U.S. PATENT DOCUMENTS

| 8,930,660 B2 * | 1/2015 | Maeda | ................ H04L 63/0823 713/153 |
| 2002/0087884 A1 * | 7/2002 | Shacham | ................ H04L 9/302 726/8 |

(Continued)

OTHER PUBLICATIONS

International Search Report and Written Opinion issued on Sep. 3, 2019 in PCT/EP2019/068845 filed on Jul. 12, 2019.

(Continued)

*Primary Examiner* — Trang T Doan
(74) *Attorney, Agent, or Firm* — Oblon, McClelland, Maier & Neustadt, L.L.P.

(57) ABSTRACT

A testing method for verifying keys uses a dataset of integers, the dataset being previously split into subsets of the integers, each subset of the integers having a product data structure for a product of the integers in the subset. Each ordered pair of subsets in the dataset has a remainder data structure for factors of the integers in the subsets of the ordered pair. The method includes creating a subset including integers to be added to the dataset of integers, and generating a product data structure for the created subset, the product data structure based on computing a product of the integers in the created subset. The method also includes identifying distinct ordered pairs of subsets, each distinct ordered pair of subsets including a subset from the dataset and the created subset.

14 Claims, 6 Drawing Sheets

(56) References Cited

U.S. PATENT DOCUMENTS

| | | | | |
|---|---|---|---|---|
| 2012/0087494 A1* | 4/2012 | Spalka | ............ | H04L 9/3066 |
| | | | | 380/46 |
| 2019/0036678 A1* | 1/2019 | Ahmed | ............ | H04L 9/008 |
| 2019/0149331 A1* | 5/2019 | Gross | ............ | H04L 9/0869 |
| | | | | 380/30 |
| 2021/0374569 A1* | 12/2021 | Jezewski | ............ | G06N 20/00 |
| 2022/0139554 A1* | 5/2022 | Pillay | ............ | G16H 70/20 |
| | | | | 705/2 |

OTHER PUBLICATIONS

Hardjono, T. et al., "A multilevel encryption scheme for database security," University of Wollongong Research Online, Faculty of Informatics—Papers (Archive), Faculty of Engineering and Information Sciences, 1989, 17 total pages, XP055524529.

Chen, Y. et al., "Faster Algorithms for Approximate Common Divisors: Breaking Fully-Homomorphic-Encryption Challenges over the Integers," EUROCRYPT 2012, LNCS 7237, 2012, pp. 502-519, XP047328720.

Bernstein, D. J. et al., "Factoring RSA Keys from Certified Smart Cards: Coppersmith in the Wild," ASIACRYPT 2013, Part II, LNCS 8270, 2013, pp. 341-360, XP047452693.

* cited by examiner

INCREMENTAL ASSESSMENT OF INTEGER DATASETS

FIELD

This disclosure relates to methods, devices and systems for incrementally assessing a dataset of integers. In particular the disclosure relates to incrementally assessing the dataset when one or more integers are to be added to it. The disclosure is particularly although not exclusively applicable to testing a dataset of integer public keys, for example integer public keys of an asymmetric encryption key-pair.

BACKGROUND

RSA (Rivest-Shamir-Adleman) is one of the first public-key cryptosystems and is widely used for secure data transmission. In such a cryptosystem, the encryption key is public, and it is different from the decryption key which is kept secret (private). In some cryptosystems, it may be that the encryption key is the secret or private key, while the decryption key may be the public key for a cryptographic key pair. In RSA, this asymmetry is based on the practical difficulty of the factorization of the product of two large prime numbers. RSA public keys contain a large integer number called the modulus (and often named n), which is the product of 2 (or more) large prime numbers p and q (called the factors). The factors are the secret or private key that is hard to retrieve, knowing only the modulus of the public key. However, considering a set of public keys comprising two public keys with respective moduli $n1=p1*q1$ and $n2=p2*q2$, there is a possibility that $p1=p2$ or $p1=q2$ or that $q1=p2$ or $q1=q2$, that is that the moduli share a common factor. In such a case, the greatest common divisor (GCD) of n1 and n2 is greater than unity, i.e. the number one, and equal to the common factor. As a result, the other factor of both moduli can be retrieved by dividing each modulus by the common factor and the security of both keys with moduli n1 and n2 is compromised because the corresponding private keys can be retrieved using the common factor and the public keys. It follows that there is a need to be able to test sets of public keys to check if any of the keys in the set have a GCD exceeding unity so that the corresponding secret keys are at risk of discovery by factoring the moduli of the public keys.

To test a dataset for detecting keys that share common factors out of a dataset of keys, one approach is to compute the GCD of all pairs of key moduli. However, this technique becomes computationally intensive as the number of keys in the dataset grows. A Batch-GCD algorithm used to compute the GCD of many integers at once is known. This algorithm provides a method that involves generating product and remainder trees for subsets of keys in the key data set. Even with the Batch-GCD algorithm, detecting common factors for large key datasets can take many days even on large computer or clusters of computers. It is believed that this is because the Batch-GCD process is iterative and intermediate computations cannot be reused when the key dataset grows. A known modification of this algorithm exists that decomposes the Batch-GCD algorithm into smaller parallelizable and independent executable tasks, while maintaining the same output. However, the output depends on all the inputs, i.e. every integer (for example, when it is a key) in the dataset, irrespective of the number of keys in the dataset and the number of keys to be added to it. Accordingly, this process is still burdensome in terms of processing, data transfers as well as time. The same issues are encountered when trying to establish whether integers in any large integer data set have a GCD greater than 1. Accordingly, the disclosure is not limited to analysing integer datasets in the context of asymmetric encryption or decryption

DETAILED DESCRIPTION

Figure 1:
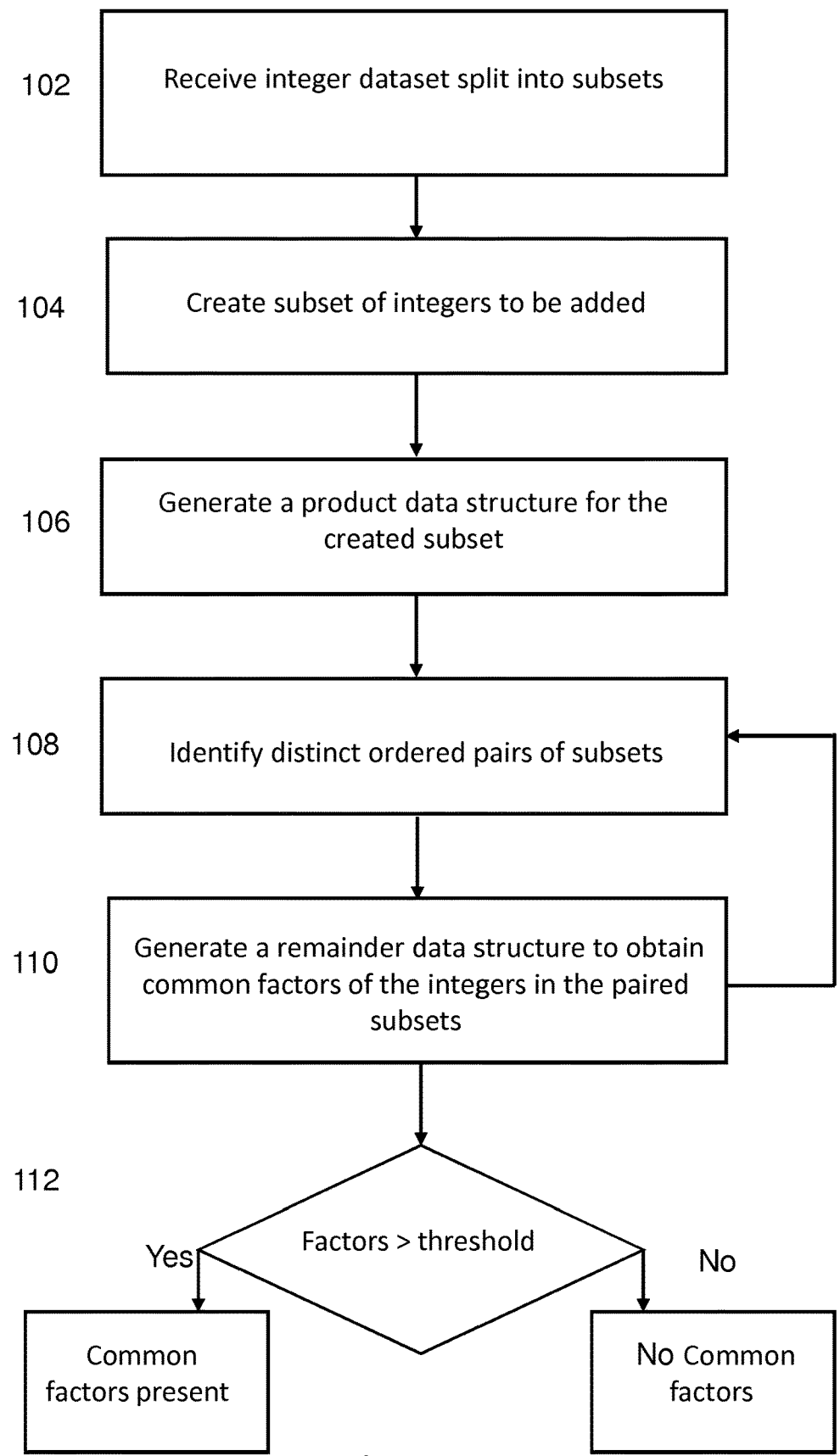
FIG. 1 is a flowchart illustrating an incremental method of incrementally assessing a dataset of integers.

In overview, aspects of the disclosure provide techniques, i.e. methods and/or associated devices and systems, for incrementally assessing a dataset of integers, when one or more integers are to be added to the dataset.

A computer implemented method for assessing a dataset of integers is disclosed. The dataset being previously split into a plurality of subsets of the integers. For example, the integers may be integer public keys for use in asymmetric cryptography, for example for use in encryption or decryption. In other examples the integer public keys may also be used for digital signatures and authentication applications. Each subset in the dataset has a product data structure that is generated using the integers in the subset to compute the product of the integers in the subset. In some embodiments, the product data structure may be a product tree. Each ordered pair of subsets in the database has a remainder data structure for computing the common factors of the integers in the subsets of each ordered pair. The pairs are considered ordered pairs, because the order of a first and second subset in a given pair is specific to that given pair and is different to other ordered pairs in the dataset. The order of the subsets in an ordered pair makes a difference to the computation of the remainder data structure. When one or more integers are to be added to the dataset, a subset is created to include the one or more integers to be added. A product data structure is then generated for the created subset to compute the product of the one or more integer(s) in the created subset. All possible distinct ordered pairs of subsets comprising on the one hand a subset from the dataset and on the other hand the created subset are then identified. Therefore, each distinct ordered pair will include the created subset as one of the subsets in the distinct ordered pair. For each distinct ordered pair identified, using the product data structure of the subsets, a remainder data structure is generated to obtain common factors of the integers in the subsets. It is then determined if the factors obtained for the integers in the subsets of each distinct ordered pair of subsets satisfies a given threshold. If so, it is validated that none of the one or more integers in the created subset have a common factor with any other integer in the dataset. If not, it is inferred that at least one of the one or more integers in the created subset has a common factor with at least one other integer in the dataset. In the former case, the method may comprise generating an output indicating that the one or more integers in the created subset do not have any common factors with the other integers in the dataset. In the latter case, the disclosed method may comprise generating an output indicating that the at least one of the one or more integers in the created subset has a common factor with another integer in the dataset. In some embodiments, the disclosed method includes adding the created subset to the dataset.

Advantageously, the disclosed method enables additions to a dataset of integers to be assessed incrementally, as and when one or more integers are added to it, without having to recompute product and remainder data structures for every possible combination of subsets in the resulting dataset. As a completely new subset is created for the dataset for one or more integers to be added, any existing data structures for previously present subsets remain the same, and therefore a product data structure for the newly created subset can be computed while reusing product data structures already computed for subsets in the data set, without having to recompute them. Remainder data structures are only computed for those ordered pairs of subsets that are distinct from existing ordered pairs in the dataset, because the distinct ordered pairs will now include the created subset. Furthermore, each of the distinct ordered pairs identified are also distinct from each other, i.e. so no two distinct ordered pairs identified are the same. Thus, a distinct, i.e. different, subset from the dataset is considered along with the created subset (the created subset being the first or second subset in the ordered pair) for each distinct ordered pair. Accordingly, if the integers are integer public keys for example, by recomputing data structures for just the portions of the dataset that are changed, and still being able to test the dataset relative to each and every other integer public key present at any given time to identify common factors, a significant amount of savings can be made in terms of processing speed, processing resources as well as on time when compared to known methodologies for testing integer public keys.

In some embodiments, the given threshold in the generation of remainder data structures is to assess if the common factors obtained for each distinct ordered pair is equal to unity, i.e. 1 (the number one). This is advantageous as the threshold allows for an accurate calculation of the greatest common divisor for the integers in the subsets of each distinct ordered pair. In other words, for this threshold it is assessed if the common factors obtained for each distinct order pair is greater than unity, i.e. 1. If, when computing the remainder tree, the result is more than 1, then a conclusion can be accurately reached that an integer in the created subset has a common factor with at least one other integer in the dataset, thereby identifying that both such integers are factorisable. If the integers represent integer public keys in some embodiments, the integer public keys are identified as weak when they can be easily factorised (for instance by any means known, such as the Batch-GCD algorithm). This is because, if there is a common factor greater than unity, i.e. 1, then the secret keys of the respective integer public keys can be derived from the common factor, in the embodiment that considers integer public keys.

In some embodiments, the product and remainder data structures are hierarchical data structures. The product data structure is generated to compute the product of the one or more integers in a given subset and is therefore a product tree in some embodiments.

In some embodiments the product data structure for the created subset is a binary product tree. When there are more than one integers in the created subset, the binary product tree is generated with the leaves of the binary product tree being the integers in the subset for which the binary product tree is computed and the root of binary product tree being the product of all the integers in that subset. For the intermediate levels between the leaves and the root, the nodes in each intermediate level of the tree are the product of its two parent nodes (going from the leaves to the root, with each pair of parent leaf notes being multiplied to produce a respective child node in the next level and so forth until the root is reached). The root or the product is considered the uppermost level of the tree and the leaves are considered the lowest level of the binary product tree. In some embodiments when the created subset includes only a single integer, then the product data structure for such a subset is a binary product tree where the leaf node is equal to the root or product, which is equal to the value of the single integer.

Advantageously, the disclosed method enables efficient use of parallelism for one or more computations by testing the dataset using the above-mentioned data structures for each subset. This is computationally more efficient and faster than known methods of applying a Batch-GCD algorithm.

In some embodiments the remainder data structure is generated to obtain the greatest common divisor of the integers in the subsets of a given distinct ordered pair of subsets. In some embodiments, generating the remainder data structure for each distinct ordered pair of subsets identified in the first aspect, comprises obtaining a modified product tree by adding the product, i.e. the root of the first subset of the ordered pair to the product data structure of the second subset of the ordered pair. Once the modified product tree is obtained, a remainder tree for the modified product tree is then generated, starting from the root of the modified product tree.

Advantageously, this enables a remainder tree to be generated using both subsets in the given distinct ordered pair, by computing the remainder tree from a product tree which includes elements from both subsets of the ordered pair. This ensures that accurate factors of the integers in the subsets of the distinct ordered pair are always obtained from such the remainder tree. For this reason, a remainder tree so computed is also referred to as a relative remainder tree.

In some embodiments, a value for each node of the remainder tree for a distinct ordered pair is computed by iteratively computing Pval mod (Vval$^2$), where Pval is the value of a node in a current level P of the modified product tree for the distinct ordered pair, starting from the root level, and Vval is a corresponding value of a node in the underlying level V of the modified product tree. This advantageously ensures that the value of each of the nodes in each level of the remainder tree is computed such that it is derived from the level above it, so that the factors of the integers in the subsets of the distinct ordered pair are accurately computed.

In some embodiments, the remainder tree for the distinct ordered pair is generated by computing a value for each node of the remainder tree iteratively, wherein for a given iteration the following inequality is first considered:

If Pval<Vval, then the value of the node of the remainder tree for the given iteration is assigned as Pval.

If Pval>Vval, then the above-mentioned formula, Pval mod (Vval$^2$) is computed to obtain the value of the node of the remainder tree for the given iteration.

Furthermore, in some embodiments, the output of Pval mod (Vval$^2$) for a given iteration is used as an input P_next for the next iteration, such that Pval=P_next for the next iteration.

The above embodiments advantageously provide for a first optimised implementation of the disclosed method, as the computation of the square and the modulo is only carried out when it makes a difference to the output of the respective remainder tree level. It is known mathematically that a mod b=a; when a<b. Thus, using the same principle, the comparison of Pval and Vval is done first, which takes less time and utilises less processing and data transfer resources when compared to computing the square and the modulo.

In some embodiments, generating the remainder tree includes first computing for each modified product tree, the number of bits (minBitLength) required to store a smallest node value for each tree level. Then, for each modified product tree, the number of bits (pLevelMaxBits) required to store a greatest node value for a current tree level (P) is computed. The number of bits (minBitLength) required to store the smallest node value for the underlying tree level to P is then identified from the earlier step. The following inequality is then assessed:

If pLevelMaxBits<2*minBitLength, then value of the node(s) of the remainder tree for a given iteration is assigned based on the current level P, and in some embodiments is the same as that of the current level.

If pLevelMaxBits>2*minBitLength, then the above-mentioned formula Pval mod (Vval$^2$) is used to compute the value of the node(s) of the remainder tree for the given iteration.

This embodiment advantageously provides for a second optimised implementation of the disclosed method by identifying if there are one or more levels in a modified product tree, for which the corresponding remainder tree level will be the same as one or more previous levels. This is done by testing a worst-case scenario for each current level (P) and underlying level (V), as if the number bits to store the greatest element in a current level is less than twice the number of bits to store the smallest element in the next level, then it can be inferred that the calculation of Pval mod (Vval$^2$) will not change for the remainder tree for this next level. Thus, the number of bits is first loaded from a memory area and tested using the above inequality for the current and next level for each iteration, rather than loading an entire tree level of the modified product tree. This takes less time and requires fewer memory calls, data transfer and bandwidth resources when compared to straightaway loading the modified product tree with all its nodes. The second optimisation can be implemented separately, or in combination with the first optimisation implementation above.

The disclosure further relates to a computer program product, or one or more non-transitory computer readable mediums including instructions, which when executed on one or more processors configures the one or more processors to implement one or more of the above described methods. Yet further, the disclosure relates to a computing device including a memory for storing data and instructions and one or more processors, wherein the instructions, when executed by the one or more processors, implement one or more of the methods described above. In another aspect, the disclosure relates to a system, which may be a cryptosystem, comprising one or more processors and one or more storage devices storing instructions that are operable, when executed by the one or more processors, to cause the one or more processors to perform the above disclosed method and related embodiments.

Although the disclosed method will be explained in relation to testing a dataset having one or more integer public keys and adding one or more such keys to the dataset, it is to be understood that the disclosure is not limited to being applied to a cryptosystem with integer public keys associated with secret or private encryption or decryption keys. Rather, the disclosure may equally be applied to any dataset or data structure that comprises integers, where there is a need for the dataset to be assessed to identify common factors or GCDs of the integers in the dataset, enabling this to be done incrementally as and when one or more integers are added to the data set.

Before discussing the disclosed method in detail, it will be useful to consider the operation of the existing batch-GCD and the distributed batch-GCD algorithm, with respect to working Examples #1 and #2 below, so that the advances and contributions provided by the disclosure is better established.

As noted above in the Background section, the Batch-GCD algorithm is a known computer implemented algorithm that is used to test a dataset of integers to identify if the integers in the dataset are factorisable, and particularly when the integers are a plurality of RSA public encryption or decryption keys. Usually, the number of keys tested are a substantial number, i.e. commonly over 10 million or so, and each RSA public encryption or decryption key is usually a large integer. Accordingly, any keys, for example encryption keys or decryption keys (especially public keys for such encryption or decryption), keys for authentication, digital signature generation etc. are herein referred to as integer public keys throughout the description.

The Batch-GCD algorithm has two steps. In a first step, a product tree is built with all integers in an input dataset. The integers in the input dataset are multiplied two at a time i.e. in pairs in a sequence, such that the first and the second integers are multiplied together, the third and the fourth are multiplied together, and so on in an iterative manner. Hence the product tree is a binary product tree. The first step builds a multiplication tree from bottom to top, with intermediate levels of multiplications, until we get the product of all the integers in the input dataset. This is the root, or top level of the tree and will usually be very large number.

In a second step, a remainder tree is built based on the product tree. Starting at the root of the product tree, the current level and the next underlying tree level are considered at once to iteratively compute, for each integer of the input dataset, the GCD or common factor relative to all other integers in the dataset.

A working example showing the operation of the Batch-GCD algorithm is discussed in Example #1 below. For ease of explanation only, this example is discussed with respect to six input integer public keys. In reality, there are millions of keys tested by this algorithm.

Example #1—The Original Batch-GCD Algorithm

Input dataset X1: [6, 15, 77, 143, 323, 437, 899]

For the purpose of explanation in the disclosure, the input numbers for this example have been selected such that:
*6 and 15 share common factor 3
*77 and 143 share common factor 11
*323 and 437 share common factor 19
*899 does not share any factor with any other number in the input but it can be factored as 29*31

Step 1: Below on each line, one iteration of the product tree of X1 is shown. The last line (root) contains the product of all input numbers Product Tree
[6, 15, 77, 143, 323, 437, 899]
[90, 11011, 141151, 899]
[990990, 126894749]
[125751427311510]

Step 2: The remainder tree starts with the root of the product tree and builds each tree level successively.

An example of the function implemented by the Batch-GCD algorithm using Sage code for the computation of remainder trees is show below:
  prods=product_tree(input_numbers)//note: prods is a list of lists (the lists in the output of the product tree example above)
  R=prods.pop ( )
  while prods:
  X=prods.pop ( )
  R=[R[floor(i/2)] % X[i]**2 for i in range(len(X))]
  return [GCD (r//n, n) for r, n in zip (R, X)]

Here X may represent a node (or value of a node), otherwise referred to herein as tree elements, of the product tree used as the input to calculate the remainder tree and R is the output of the calculation of the elements in the remainder tree from the upper level to the leaf level. The computations for the above algorithm are explained in more detail in the first scenario set out in Example #2 relating to a distributed version of the Batch GDC algorithm.

Below is the output for the example input numbers in dataset X1:
Remainder Tree
  [125751427311510]
  [47596258710, 125751427311510]
  [2610, 69347278, 13557412399, 483662]
  [18, 135, 1694, 4719, 67507, 141151, 483662]
  [3, 3, 11, 11, 19, 19, 1]

As a result, [3, 3, 11, 11, 19, 19, 1], is obtained which can be matched with the input numbers X [6, 15, 77, 143, 323, 437, 899] and interpreted as:
  [6, 15, 77, 143, 323, 437, 899]
  | | | etc.
  v v v
  [3, 3, 11, 11, 19, 19, 1]

In other words,
  6 has a common factor 3 with another number in the input X1
  15 has a common factor 3 with another number in the input X1
  77 has a common factor 11 with another number in the input X1
  143 has a common factor 11 with another number in the input X1
  323 has a common factor 19 with another number in the input X1
  437 has a common factor 19 with another number in the input X1
  899 has no common factors In the distributed version of the existing Batch-GCD algorithm, the input dataset X1 is split into k subsets, allowing the computation to be divided into independent product trees. The product tree of each subset can be computed independently and in the case of the remainder tree step, instead of computing one large remainder tree, k^2 (k*k) smaller and independent remainder trees are computed for each possible ordered pair of subsets.

For computing the remainder tree in the distributed version of the algorithm, the same Batch-GCD algorithm as explained above in relation to Example #1 is used, except that the product tree used as an input for the computation of the remainder trees in this distributed version is slightly different to the one shown in Example #1. A modified product tree is built for each ordered pair of subsets (let us take S1, S2 for example) by taking the root tree level of the product tree of the first subset in the pair S1 and adding that level on top of the product tree of the second subset in the pair (S2), thus producing a modified product tree which is almost the same as the one for S2, except that it has one more level on top of the root level of S2. The remainder trees computed from such a modified product tree are therefore referred to as a relative remainder trees for the distributed Batch-GCD algorithm.

A working example showing the operation of the distributed Batch-GCD algorithm is discussed in Example #2 below. For ease of explanation only, this example is discussed with respect to the same six input integer public keys as discussed above in Example #1.

Example #2—the Known Distributed Batch-GCD Algorithm

Considering the same input numbers for an input dataset X1: [6, 15, 77, 143, 323, 437, 899], we can choose k=2 subsets.

The input X1 is thus split into k=2 subsets:
  S1=[6, 15, 77, 143] and
  S2=[323, 437, 899]

The product tree is computed for each subset:
Product Tree S1
  [6, 15, 77, 143]
  [90, 11011]
Product Tree S2
  [323, 437, 899]
  [141151, 899]
  [126894749]

The relative remainder tree is then computed for each possible ordered pair of subsets.

For the example, we get 2^2=4 pairs to compute: [(S1, S1), (S1, S2), (S2, S1), (S2, S2)]. We refer to these as ordered pairs, as the order of the first and second subset in each pair makes a difference to the computation of the relative remainder tree. Therefore (S1, S2) is different to (S2, S1) as will provide different results for their respective relative remainder trees.

To compute the relative remainder tree for each ordered pair of subsets noted above, it is required to first build a modified product tree that is based on the product tree of the second subset in the ordered pair, with an added tree level on top of its root level. This added level is the root level of the product tree of the first subset in the ordered pair of subsets.

To demonstrate the operation of building a relative remainder tree, it is useful to discuss a first scenario for an ordered pair of subset (E1, E2)

Let us assume that E1's product tree is:
  [6]←root level (1 element or node)
  [2, 3]←intermediate level (2 elements)
  [1, 2, 3]←bottom (leaf) level (3 elements)
And E2's product tree is:
  [120]←root level
  [20, 6]←intermediate level
  [4,5,6]←bottom (leaf) level A modified product tree computed for the ordered pair (E1, E2), which is E2's product tree with E1's root level on top of it is shown below. Note that the root is shown at the top of the tree rather than the bottom
  [6]←from E1(root or upper level of modified product tree)
  [20, 6]
  [4, 5, 6]

Then the Batch-GCD remainder tree algorithm explained in Example #1 to the modified product tree above.

Considering that P is a current level to be considered for the modified tree and V is the underlying level immediately below, the computation starts from the root level First Iteration:
P=[6]
V=[120]
We obtain each remainder tree element to be considered for the next iteration P_next by calculating the Pval mod (Vval$^2$), where Pval and Vval are the tree elements, i.e. node or vale of the nodes in levels P and V, respectively.
P_next=[6 mod 120^2]=[6]
Second Iteration:
P=P_next=[6]
V=[20, 6]←taking the next tree level, i.e. underlying tree level of the modified product tree
P_next=[6 mod 20^2, 6 mod 6^2]=[6, 6]
Third Iteration:
P=P_next=[6, 6]
V=[4, 5, 6]
P_next=[6 mod 4^2, 6 mod 5^2, 6, 6 mod 6^2]=[6, 6, 6]
For the final iteration and last step of the Batch-GCD algorithm, the GCD's are computed for P_next [6, 6, 6] and V [4, 5, 6] from the last iteration to arrive at the result.
Thus:
X=V=[4, 5, 6] in the Batch-GCD algorithm
R=[6, 6, 6]—this is P_next calculated from the previous iteration
From results of each P_next and R computed from above, we obtain the below relative remainder tree for ordered pair [E1, E2] as:
[6]
[6]
[6, 6]
[6, 6, 6]
[2, 1, 1]←final result The final result provides the respective GCD or factor of the keys in the paired subsets, i.e. the subsets of a given ordered pair. If a respective factor is equal to 1, then the it can be concluded that the modulus does not have any common factor with any other key in the paired subsets. If the factor is larger than 1, then the modulus shares that factor with some other key in paired subsets.

Thus, for computing the relative remainder tree the formula P_next=Pval mod (Vval$^2$) is used, where Pval and Vval represent each remainder tree element being calculated and their values can change with each iteration as they rely on the calculation made for upper levels to a current level P. Pval is always an element considered for the current tree level P and Vval is always an element in the underlying tree level V.

To identify which Pval is used for each Vval to apply the above formula, it may be possible to obtain the index of the element in the current tree level (i_P) with the formula i_P=i_V//2. For example, if the current level has two elements [2, 3] and an underlying level with three elements [1,2,3], then each element in the lower level can be considered sequentially. First, Vval=1, then Vval=2, then Vval=3. When Vval=1, then Pval=2 is used (the element above it, or in other words, its parent in the tree), when Vval=2 we also use Pval=2 (because this is above) but when Vval-3, the element above is 3, not 2 so Pval=3.

Returning now to the subsets in Example #2, for computing the relative remainder trees, the input (the list of lists named "prods") in the code portion of the known Batch-GCD algorithm in Example #1, i.e. prods=product_tree (input_numbers), is different for the distributed version Batch-GCD algorithm, as explained in the first scenario above.

In Example #1 the remainder tree is computed based on a single product tree (of X1) that has 4 levels:
[6, 15, 77, 143, 323, 437, 899]
[90, 11011, 141151, 899]
[990990, 126894749]
[125751427311510]

The modified product tree for calculating the relative remainder tree for ordered pair (X1, X1) would thus have 5 levels:
[6, 15, 77, 143, 323, 437, 899]
[90, 11011, 141151, 899]
[990990, 126894749]
[125751427311510]
[125751427311510]—the added level from the root of X1

The Batch-GCD algorithm is then applied using this modified product tree to obtain the relative remainder tree for computing P_next=Pval mod (Vval$^2$) for each iteration, as explained in the first scenario.

The relative remainder tree results for all pairs in Example #2 are shown below:
Relative Remainder Tree: (S1, S1)
[990990]
[990990]
[2790, 990990]
[18, 90, 847, 9438]
[3, 3, 11, 11]
Relative Remainder Tree: (S1, S2)
[990990]
[990990]
[990990, 182789]
[52029, 36145, 182789]
[1, 1, 1]
Relative Remainder Tree: (S2, S1)
[126894749]
[126894749]
[149, 5652628]
[5, 149, 2291, 8704]
[1, 1, 1, 1]
Relative Remainder Tree: (S2, S2)
[126894749]
[126894749]
[126894749, 7192]
[30685, 91333, 7192]
[19, 19, 1]

The results obtained for all relative remainder trees are:
[[3, 3, 11, 11], [1, 1, 1], [1, 1, 1, 1], [19, 19, 1]]

It will be noted that the results of Example #2 are the same as with the original Batch-GCD method in Example #1, but with smaller and less processing intensive computations required.

As is evident from Examples #1 and Example #2 discussing known methods of the Batch-GCD algorithm to identify and compute common factors of an input dataset X1, the output relies on the data X1 in entirety.

In Example #2, the Batch-GCD computation is parallelised by dividing the input into k subsets to compute a product tree over each subset. However, for each subset of the k subsets, it is still necessary to compute a relative remainder tree with respect to all other subsets to obtain the result, by which it is possible to identify if the integer public keys in the dataset X1 have a common factor with at least one other key in the dataset X1, thereby making the keys vulnerable, as their secret key or private keys can be derivable.

Accordingly, the amount of computation is higher even though a speedup of the process is obtained in Example #2, when compared to Example #1 due to parallelism. This is because the distributed Batch-GCD algorithm in Example #2 avoids the bottleneck of computing resources and time as very large products need to be processed X1 in Example #1. Even if a single new integer public key is to be added to the dataset, the above computation has to be repeated from the beginning, as the test depends on all the keys in the dataset X1. The distributed Batch-GCD algorithm is thus non-incremental as all keys in a dataset must be tested at once, even when a minor change is made to the keys in the dataset.

The disclosed method provides techniques for assessing a dataset of integers incrementally in a computationally efficient manner and within significantly less amount of time, when compared to the existing techniques set out above to arrive at an accurate result. As seen in Examples #1 and #2 above, the assessment in some embodiments may be to test the strength of integers that represent public encryption keys but may be understood as also representing public decryption keys in embodiments and instances where public keys are used for decryption, instead of encryption. The disclosed method provides a technique for performing Batch-GCD computations on a part of an input dataset of a plurality of integers when one or more new integers, not previously present in the dataset, are to be added to the dataset. Though aspects and embodiments will be explained below in terms of a dataset in a cryptosystem including integer public keys that are to be tested (so that their secret or private keys are not compromised), the techniques can be extended to any dataset including integers.

The disclosed method proposes techniques whereby previously computed data structures, such as hierarchical data structures like product and remainder trees, for a dataset can be reused for testing the dataset when one or more new integers are added to.

To practically explain the disclosed method, lets us consider a second scenario where there is a current dataset of 279 million integer public keys (279'000'000). As with the distributed Batch-GCD algorithm, we can consider that the keys are split into subsets of 5 million keys each. In that case, the last subset may be slightly smaller than the others, because the number of keys in the dataset is not a multiple of the subset size (5 million). According to some embodiments, unbalanced subsets with different number of keys do not impact the output of the algorithm as each subset is considered as a separate entity for further computation, irrespective of the number of integers in a given subset. In this specific scenario, since there are 279 million keys and the subset size is 5 million, we have k=56 subsets, where k is the number of subsets to be tested in the dataset. If a new key is to be tested with the keys in a current dataset, it has to be added to the current dataset which becomes a new dataset of 279 million and 1 key (279'000'001) to be tested, by appending the new key to the last or any one of the existing (k) subsets of the previously split dataset.

The disclosed method proposes a method whereby a new subset (the 57th subset, being subset k+1) is created and the created subset is added to the dataset containing this single new key. This aspect will be demonstrated in working Example #3 below. More than one new key can be added to the newly created subset, i.e. the 57th subset. A plurality of new subsets (k+2, k+3 and so on) can also be added to the dataset, where each new subset may include the same number of, or different number of new keys that are to be added to the dataset. For instance, a reason for having two or more subsets added to a dataset at the same time may within a defined memory and parallel processing constraint, if any. In the second scenario, 5 million has been considered as in practical terms computations with larger subsets may require a significantly large amount of memory, which may only be possible where such memory resources are available in distributed computing systems.

The disclosed method obtains as an input a dataset where the integer public keys are previously tested using the distributed Batch-GCD algorithm. This is so that the product tree of each of the k subset, as well as relative remainder tree of each subset relatively to each other subset (including itself) are computed. Thus, if there are k subsets, then k product trees are computed, and $k^2$ (so k*k) relative remainder trees are computed. For the first aspect, any new key to be added to the dataset must be done after this distributed Batch-GCD computation.

Figure 4:
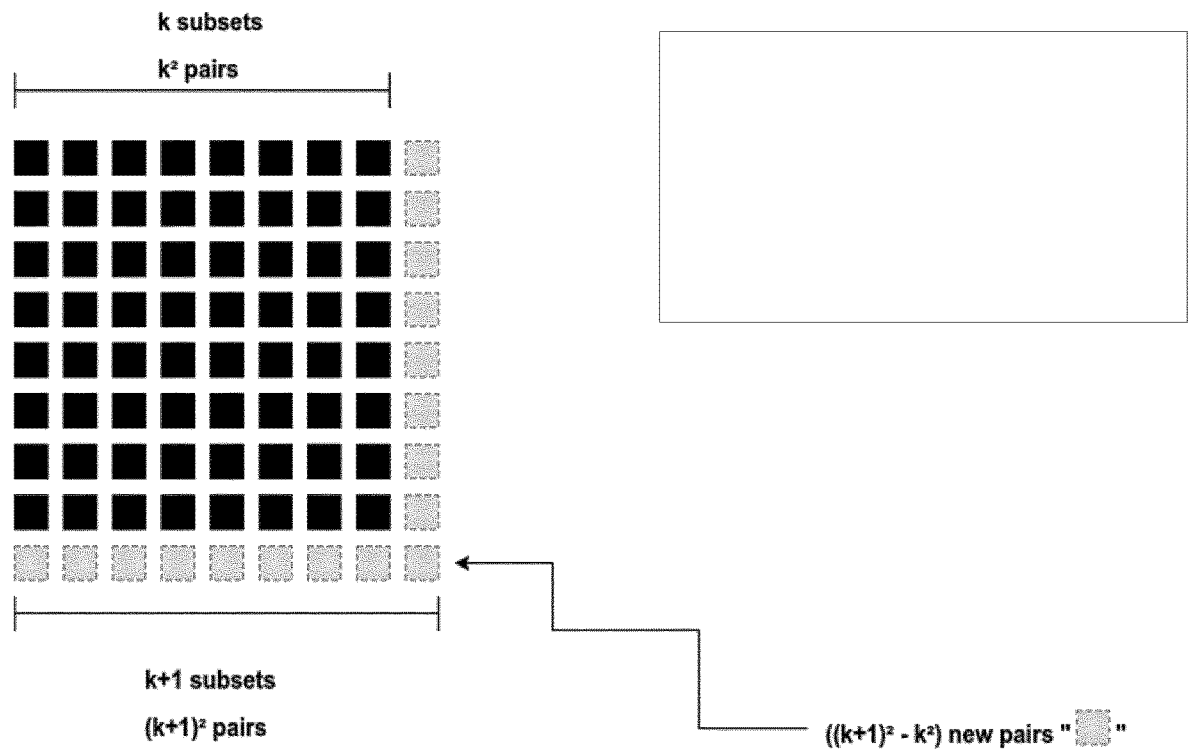
FIG. 4 is a grid depicting integer pairs for which remainder trees are computed by the incremental method.

The disclosed method proposes that only $(k+1)^2-k^2$ relative remainder trees, so $57^2-56^2=113$ relative remainder trees in the second scenario, are required to be computed for the new subset to be accurately and efficiently tested with the other keys in the dataset. This is instead of computing $57^2=3249$ relative remainder trees for the dataset (which would have been the case if the distributed Batch-GCD algorithm as seen in Example #2 is applied, where is necessary for all keys to be computed at one at once). This significant reduction in the number of relative remainder trees to be computed for the disclosed method is represented in the grid in FIG. 4 representing the previously present subset pair and the pairs with the newly added subset in the dataset.

Accordingly, about 3% or 4% (when k=57) of the relative remainder trees are computed to incrementally test a new key that is to be added to the dataset. In some implementations, the incremental testing of a new subset serves as testing the new subset with existing keys contained in subsets of the dataset. As the intention is to find if the integers in the dataset have common factors, this factor will always be common to at least two keys. Therefore, it is possible that the two keys sharing a common factor are in the same subset (the new one) or that one of the keys is in the new subset and the other one is in another subset that was previously present in the dataset, i.e. one of the 56 subsets in the second scenario.

In some implementations, the disclosed method can be understood as testing a new dataset as a whole, i.e. which is composed of all previous subsets, plus the new added one, by incrementally computing product and remainder trees (relative remainder trees) for the parts of the dataset that change (remainder trees for the new subset pairs and the product tree of the new subset), when adding the new subset.

If one new subset is added so that there are now 57 subsets, accordingly to the disclosed method only one new product tree is now to be computed. This is because the first 56 product trees previously computed for the dataset do not change and these trees can be reused for the computation of the relative remainder trees, as explained below in Example #3.

Some specific components and embodiments of the disclosed method are now described by way of illustration with reference to the accompanying drawings, in which like reference numerals refer to like features.

Figure 5:
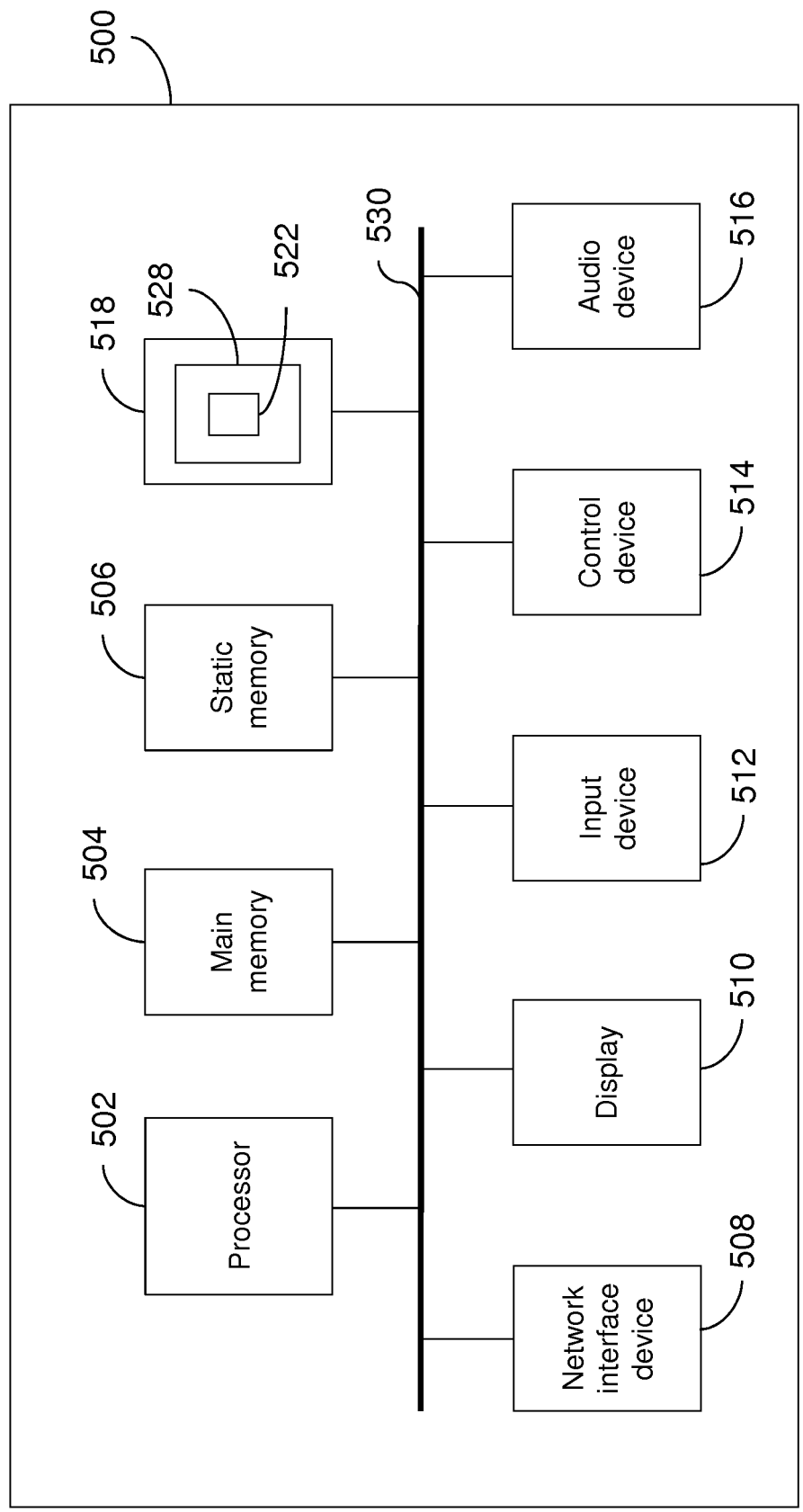
FIG. 5 is an example of a computing device suitable for implementing the incremental method.
Figure 6:
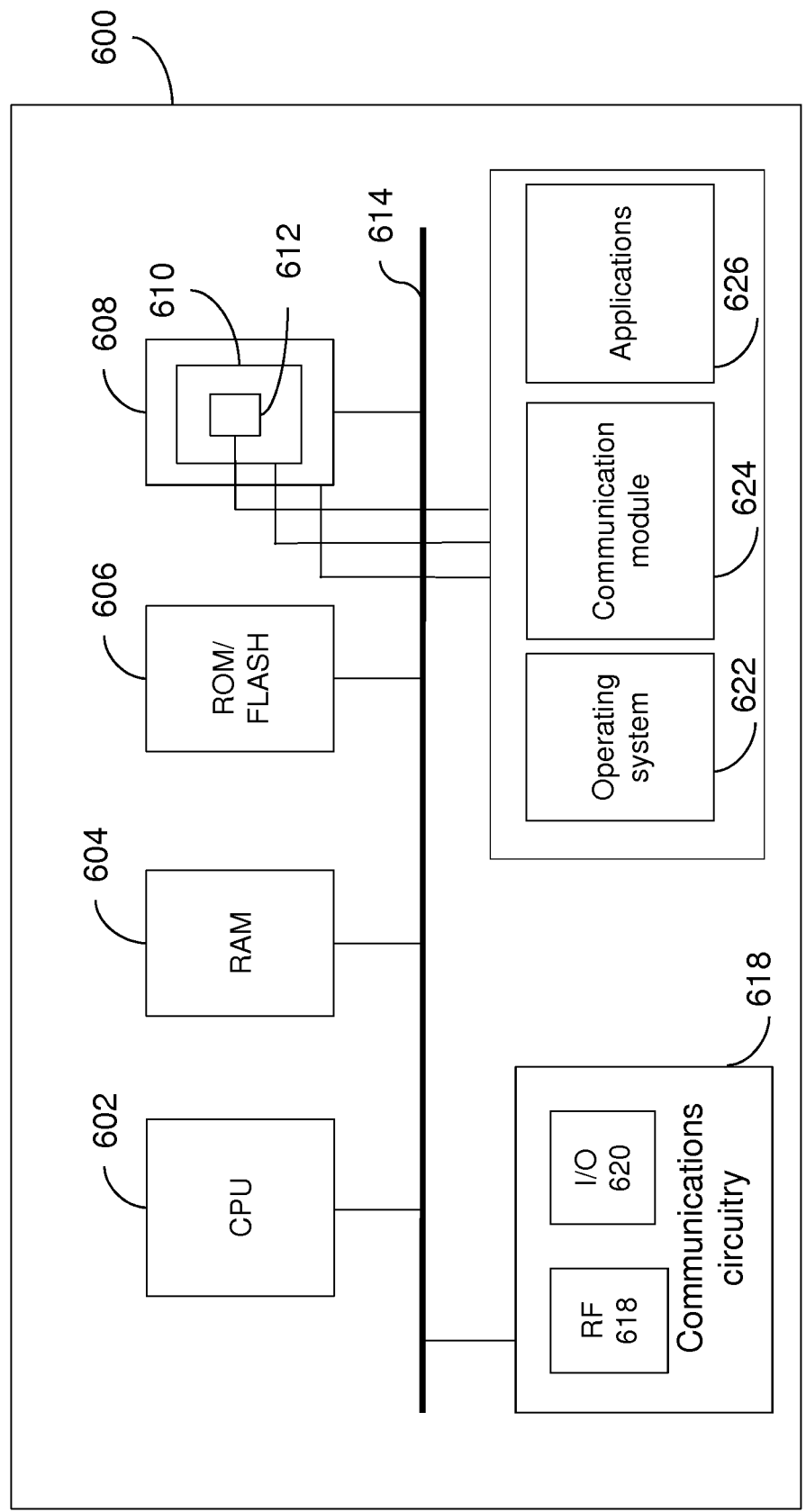
FIG. 6 is an example of a specific hardware implementation of a system for incrementally testing a dataset comprising a plurality of integer public keys.

The disclosed method is understood to be implemented in a computing environment, such as shown in FIG. 5. A specific hardware architecture implementation of a system, for incrementally testing a dataset comprising a plurality of integer public keys is shown in FIG. 6. Aspects of the disclosure herein are implemented using one or more such computing devices, each including one or more processors that are suited to execute instructions in one or more programming languages for carrying out computations, data transfers, memory allocations and iterations. The instructions, along with input data (such as the integers in a dataset and further integers to be added to a dataset), intermediate results (such as during creation of a data structure, i.e., the tree levels for product and remainder trees etc) and output data (the GCD or factors) may be stored in a memory area, which may be integrated within or remotely coupled to the devices seen in FIG. 5 or 6, which are explained in detail below.

The memory area is configured to store and process hierarchical data structures, such as binary product trees and remainder trees, where each node or element of the data structure can accommodate a large integer as the value assigned to the node or element.

The instructions for implementing aspects of the present application are understood as being provided in the form of a software program. The code, i.e. the instructions, may be in a plurality of programming languages for execution. As the aspects of the disclosure sometimes require the handling of large integers that are arranged in the form of a hierarchal data structure, programming languages that are suitable for handling such data structures may be more suitable implement such aspects in a scalable manner. For instance, Java™ may be used, provided that the data and data structures can be handled within the JVM limitations, such as the maximum length of Strings, as the integers numbers grow larger and larger with successive iterations. Chapel™, which is a programming language made for distributed computing may also be suitable. Some parts of the Batch-GCD algorithm for instance may also be partly implemented using FastGCD™ which is a specific single-machine Batch-GCD open source C implementation.

FIG. 1 is a flowchart that depicts the operation of the method for incrementally testing one or more integers to be added to a dataset. The steps of FIG. 1 will be explained along with working Example #3 below. In this example, the addition of a new key (8th key and 3rd subset) is discussed as being added to the dataset X1 in Example #2 above, to create a new dataset X3 for Example #3.

Example #3

In Step 102 a tested dataset is provided, which comprises a plurality of integer public keys that have already been tested relative to each other. In some embodiments, this will be dataset X1 in Example #2, where the factors of the seven integer public keys relative to each other have already been computed. Accordingly, the product trees and relative remainder trees for X1 are obtained in this step.

In Step 104, one or more new integer public keys to be added to the dataset X1 are provided. As explained above, to add one more key a new subset is created for the dataset. Accordingly, new subset S3 is created for one or more new integer public keys, so that the new key(s) can be added to dataset X1. Step 104 results in a new dataset X2 that includes previous subset S1 and S2 and new subset S3 as shown below.

The new input data X2 now looks like:
S1=[6, 15, 77, 143] and
S2=[323, 437, 899] and
S3=[1147]
Note: 1147 is chosen for example only, because it shares a common factor with 899 (that factor is 31). As with the previous examples, these integers have been chosen to aid a better understanding of the process, and the disclosure is not limited to these example integers in any way.

In Step 106, one or more product trees are computed for the newly added subset(s). In this example only one product tree is required to be computed, i.e. the product tree for S3. This is because the product trees of S1 and S2 have already been computed when the dataset was X1. According to the disclosed method, there is no requirement to recompute, them since S1 and S2 are unchanged. The method for computing the product tree is the same as explained above in Examples #1 and #2, i.e. a binary product tree where the integers are multiplied two by two in a sequence. If there is only one integer, then the product tree will include only one tree level, i.e. the root with the single integer. The root level will be equal to the lowest (leaf) level, which is the single integer in the subset. In this case, [1147].

The following results are then obtained with the new input dataset X2 having 3 subsets:
Product Tree S1 (from Example #2)
    [6, 15, 77, 143]
    [90, 11011]
    [990990]
Product Tree S2 (from Example #2)
    [323, 437, 899]
    [141151, 899]
    [126894749]
NEW Product Tree S3—(Computed Now for Example #3)
    [1147]

In step 108, ordered pairs of subsets that include the newly added subset (S3 in this example are identified. In Example #3, as k=3 and therefore there are k^2-9 possibilities of ordered pairs of subsets. All possible ordered pairs of subsets S1, S2, S3 are:
    [(S1, S1), (S1, S2) (S1, S3), (S2, S1), (S2, S2), (S2, S3),
    (S3, S1), (S3, S2), (S3, S3)]
However, the relative remainder trees for (S1, S1), (S1, S2), (S2, S1) and (S2, S2) are already computed (from Example #2 for dataset X1).

Thus, ordered pairs that are distinct from the previous dataset X1 and not yet considered are: [(S1, S3), (S2, S3), (S3, S1), (S3, S2), (S3, S3)]. These are the set of ordered pairs identified, where one of the paired subsets is S3, the newly created subset.

In step 110, remainder trees are computed for each of the distinct ordered pairs identified at the outcome of step 108, i.e. the five ordered pairs [(S1, S3), (S2, S3), (S3, S1), (S3, S2), (S3, S3)]. As with Example #2, these are relative remainder trees that are calculated using the modified product trees for each ordered pair.

In the last step of the remainder tree computation, i.e. GCD (r//n, n) for r, n in zip (R, X) from the Batch-GCD algorithm in Example #1, it is considered if "r" is divisible by "n". If that is the case, then the algorithm is unchanged.

In some embodiments, when r is not divisible by n, then r/n cannot be computed, and therefore the GCD is straightaway computed instead, i.e. GCD (r, n) instead of GCD (r//n, n).

The last step for computing the remainder tree result is explained below, building on the first scenario set out in Example #2:

In the first scenario for the final iteration after the third iteration, the GCD is computed based on P_next [6, 6, 6] and V [4, 5, 6] to arrive at the result, i.e. factors.

In some embodiments relating to the first aspect, for computing the GCD's it is possible to assign the values of V and P_next to X and R, respectively, for the Batch-GCD algorithm, set out in Example #1 to get:

X=V=[4, 5, 6]

R=[6, 6, 6]←this is P_next calculated from the previous iteration

Thus, for the final result the GCD for R, X is computed for each R and X element. This will be [cGCD (6, 4), cGCD (6, 5), cGCD (6, 6)]=[2, 1, 1]

It is noted that unlike with the other the first two cGCDs, 6 and 6 are divisible (unlike, (6, 4) and (6,5)). Therefore cGCD (6, 6)=GCD (6/6, 6) because 6 is divisible by 6, which is equal to GCD (1, 6)=1, rather than GCD (6, 6)=6.

cGCD above refers to conditional GCD where we compute GCD (r//n, n), if r is divisible by n. If not, the GCD (r, n) is obtained otherwise.

Accordingly, in step 110 the relative remainder trees computed for each of the ordered pairs of subsets identified in step 108 are shown below:

Relative Remainder Tree: (S1, S1)
[990990]
[990990]
[2790, 990990]
[18, 90, 847, 9438]
[3, 3, 11, 11]

Relative Remainder Tree: (S1, S2)
[990990]
[990990]
[990990, 182789]
[52029, 36145, 182789]
[1, 1, 1]

For the above, it is noted that the last step is slightly different as the numbers are not divisible. For example, 990990 is not divisible by 323 nor by 437. In this case the GCD can be computed directly (to obtain GCD (990990, 323)=1, for example)

NEW Relative Remainder Tree: (S1, S3)
[990990]
[990990]
[1]

Relative Remainder Tree: (S2, S1)
[126894749]
[126894749]
[149, 5652628]
[5, 149, 2291, 8704]
[1, 1, 1, 1]

Relative Remainder Tree: (S2, S2)
[126894749]
[126894749]
[126894749, 7192]
[30685, 91333, 7192]
[19, 19, 1]

NEW Relative Remainder Tree: (S2, S3)
[126894749]
[596285]
[31]

NEW Relative Remainder Tree: (S3, S1)
[1147]
[1147]
[1147, 1147]
[31, 22, 1147, 1147]
[1, 1, 1, 1]

NEW Relative Remainder Tree: (S3, S2)
[1147]
[1147]
[1147, 1147]
[1147, 1147, 1147]
[1, 1, 31]

NEW Relative Remainder Tree: (S3, S3)
[1147]
[1147]
[1]

In step 112, the results of each of the relative remainder trees, which is an indication of the GCD of the integers in the ordered pair or subsets is obtained. For the ordered pair of subsets in Example #3, we thus have [[3, 3, 11, 11], [1, 1, 1], [1], [1, 1, 1, 1], [19, 19, 1], [31], [1, 1, 1, 1], [1, 1, 31], [1]]

When compared to the dataset X1 in Example #2, a new factor 31 has been identified by computing the identified ordered pairs in step 108, i.e. the ones involving S3, where such factor does not appear in other pairs.

Accordingly, the results of step 112 is mapped with the integers of the paired subsets in each respective distinct ordered pair to determine the integers that have a GCD>1 with another integer in dataset X2 that includes three subsets S1, S2 and S3. If the integers have a GCD>1, then according to the disclosed method, an output is generated indicating that at least one of the one or more integers in the created subset have a common factor with the other integers in the dataset. If not, then according to the disclosed method the one or more integers in the created subset (S3) are validated in that they do not have any common factor with other integers in the dataset and hence are not factorisable. In addition, an output is generated indicating that the one or more integers in the created subset do share a common factor with other integers in the dataset.

In Example #3, the relative remainder tree computation of $3^2 2^2 = 2 = 9 - 4 = 5$ new pairs were required, instead of computing all 9 pairs again. Note that in this case, going from k=2 to k+1=3 subsets requires a computation of $((k+1)^2 - k^2)/((k+1)^2) = (9-4)/(9) = 5/9 = 55\%$ of the total computation and associated time and processing resources instead of recomputing 100%, as would have been required for the known methodologies both Example #1 and Example #2.

In some embodiments, disclosed method includes scaling the steps explained in FIG. 1 and Example #3 for more subsets. For example, when going from k=49 to k+1=50 subsets, it is required to compute $(50^2 - 49^2)/(50^2) = 4\%$ instead of the 100%, which is a significant reduction in the amount of processing required. Thus, the disclosed method becomes more and more efficient, relative to the baseline or starting point of the computation as the number of subsets increase.

It is to be noted that having more number of subsets does mean computing more ordered pair in the first place. Therefore, for some implementations there may be a need to identify a reasonably good trade-off by running benchmarks with different values for k and selecting the best number of subsets an input dataset.

In some embodiments, the disclosure relates to processes for further optimising the computation of the relative remainder trees according to the disclosed method in FIG. 1. This optimisation is by providing one or more methods for reducing the amount of computation that is required for computing each level of the relative remainder tree for a given set of identified distinct ordered pairs.

A first optimisation is concerned with optimising the computation of the remainder tree elements. This is the computation of P_next=Pval mod (Vval^2) explained above in the first scenario that is used for computing the remainder trees of the disclosed and associated embodiments of the disclosure. It is to be noted that in some example implementations, the first optimisation may also be applied for the distributed Batch-GCD algorithm in Example #2. However, as the number of distinct ordered pairs of subsets in the disclosed method in Example #3 is much less that the ordered pairs to be considered in Example #2, the optimisation is much more effective for the disclosed method. Pval and Vval represent remainder tree elements being calculated for a current P and underlying (or subsequent) level V, where P and V change with each iteration. Pval is always an element considered for the current tree level P and Vval is the element in the underlying tree level V, as explained in the first scenario.

The product of the integers in the new subset S3 in Example #3 containing the new integer public keys is in most cases, but not necessarily all cases, is small in comparison with the product of the elements of the other subsets, S2 and S1. In the remainder tree step, as shown in the first scenario, modulo operations are performed for computing P_next to identify the elements or nodes of the remainder trees. When the remainder tree of the last subset S3 relative to another subset S1 or S2 is computed, for the uppermost or root level, the modulo of an integer with a larger integer than the number itself is computed. As is known, mathematically, this computation does not have any effect since a mod b equals "a", if a<b. This same inequality can be applied to the computation on P_next=Pval mod (Vval^2).

Accordingly, in the first optimisation Instead of computing P_next=Pval mod (Vval^2) for each iteration from the modified product tree, Pval less than Vval (Pval<Vval) is evaluated first, which is computationally cheaper, i.e. uses less resources than computing the square and then the modulo.

If Pval<Vval, then it is the value of P_next is simply assigned to Pval, without requiring the calculation of the square and the modulo.

If Pval>Vval then P_next is to be calculated as Pval mod (Vval^2) for the current iteration.

Figure 2:
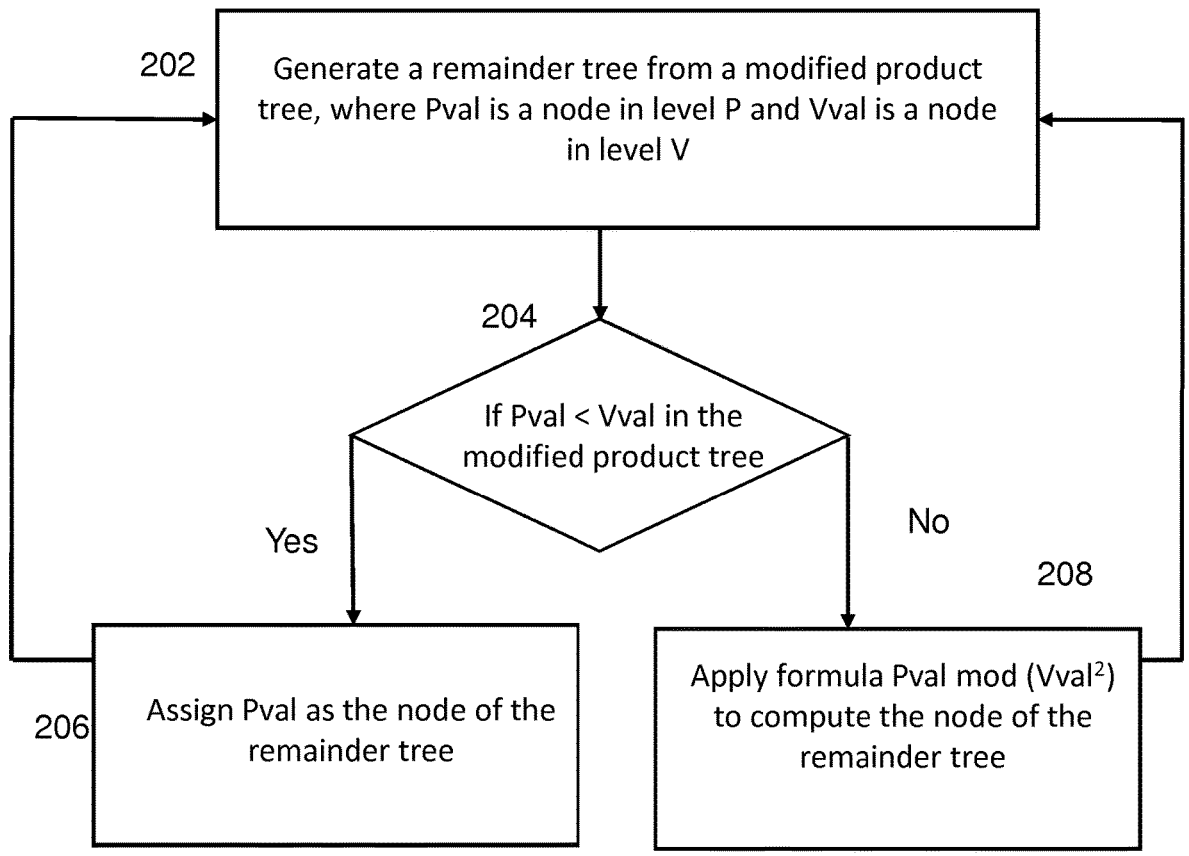
FIG. 2 is a flowchart depicting a first method of optimising the implementation of the incremental method.

The first optimisation is further explained in Example #4 below, with reference to FIG. 2 of the accompanying drawings Example #4

The relative remainder tree of pair (S3, S1) above in Example #3 is considered for this example:
NEW Relative Remainder Tree: (S3, S1)
 [1147]
 [1147]
 [1147, 1147]
 [31, 22, 1147, 1147]
 [1, 1, 1, 1]
The product trees of S3 and S1, are:
Product Tree S3
 [1147]
Product Tree S1
 [6, 15, 77, 143]
 [90, 11011]
 [990990]
Step 202 of FIG. 2 begins with obtaining a modified product tree, as explained above in Example #3 for computing the relative remainder tree for a given ordered pair of subsets. The modified product tree would thus be:
Modified Product Tree S3, S1
 [6, 15, 77, 143]
 [90, 11011]
 [990990]–V level
 [1147]–P level (from S3)
So, starting with the first i.e. root level P, we see that Pval=1147 and Vval=990990

In step 204 a determination is made sf Pval<Vval. In this example, the first relative remainder tree level P has output [1147]. Therefore, this inequality is true.

As seen in the first scenario for Example #2, for computing the relative remainder tree, the output of one iteration depends on the output of the previous iteration.

In step 206, the inequality Pval<Vval is true, and therefore P_next for the calculation of the remainder tree elements for the next underlying level is straightaway assigned the value of Pval, i.e. 1147 in this case, without requiring any further calculation.

If Pval<Vval was False, then the Pval for the subsequent level for the relative remainder tree will require the calculation of Pval mod (Vval^2). In this, example 1147 mod (990990^2), in step 208.

In Example #4, since 1147 is less than 990990, the result can simply be 1147 for the level P without having to compute the square of 990990 or the modulo. Thus, only a comparison of Pval and Vval is required to identify a remainder tree element, which takes up significantly less amount of time and processing resources compared to a computation of the modulo.

A second optimisation according to some embodiments if the disclosure is also concerned with reducing the amount of time and processing resources for the computation of remainder tree elements. This implementation is based on the consequence of implementing the disclosed method described in relation to FIG. 3 for computing the relative remainder trees of the distinct ordered pairs. The consequence is that there is almost certain to be multiple tree levels in a relative remainder tree for which the level output P_next is unchanged from the previous level's output. This implies that the output of some tree levels for a relative remainder tree is independent from the previous level, and sometimes independent from multiple previous levels. Accordingly, such independent levels can be ignored ad they are not necessary for computing the output Therefore obtaining, uploading or reading level data for a such an independent level of the corresponding modified product tree from a memory area or device so that it can be accessed by a processor at runtime to implement the disclosed method is now not required. The second optimisation is related to identifying such independent tree levels in the modified product tree for which the corresponding relative remainder tree levels are independent to the level just above it.

For the second optimisation, it may be first required to build a tree level minimum element bits index for the modified product tree of a given ordered pair of subsets. This index provides, for each tree level that is stored in a storage area, such as a memory or a disc, the number of bits required for holding the smallest element or value of a node in that tree. This index is in some embodiments built once in advance and does not to be rebuilt when new keys are added. When performing incremental key testing, according to the disclosed method as explained in Example #3, the index containing the bit length for each tree level's minimum element can quickly and easily be loaded at runtime without any data or bandwidth associated overheads. Such index will be a relatively small amount of data to load, when compared to loading the entire level of the modified product tree.

A bit length of the smallest element vMin in an underlying tree level V of the modified product tree for a given ordered pair of subsets (minBitLength) is compared to the bit length of the maximum element pMax in a current tree level P (pLevelMaxBits). When pLevelMaxBits<(minBitLength*2), according to the second optimisation it is inferred that reading the entire underlying tree level V from wherever it is stored in memory can be skipped entirely, thereby saving I/O time and data overheads. The reason for comparing pLevelMaxBits to 2*minBitLength is because, to determining the elements of a remainder tree P_next=Pval mod (Vval^2) is computed. Since Vval is squared, the number of bit for this level are doubled. Thus, the number of bits of the maximum element in level P must be smaller than twice the number of bits of the minimum element of level V in the modified product tree for the second optimisation proposed to be applied.

The operation of the second optimisation is further described with reference to FIG. 3 and working Example #5 below. It is to be understood that the second optimisation can be implemented separately for the disclosed method as seen in Example #3 or can be implemented in combination with the first optimisation explained above in relation in Example #4.

Example #5

Figure 3:
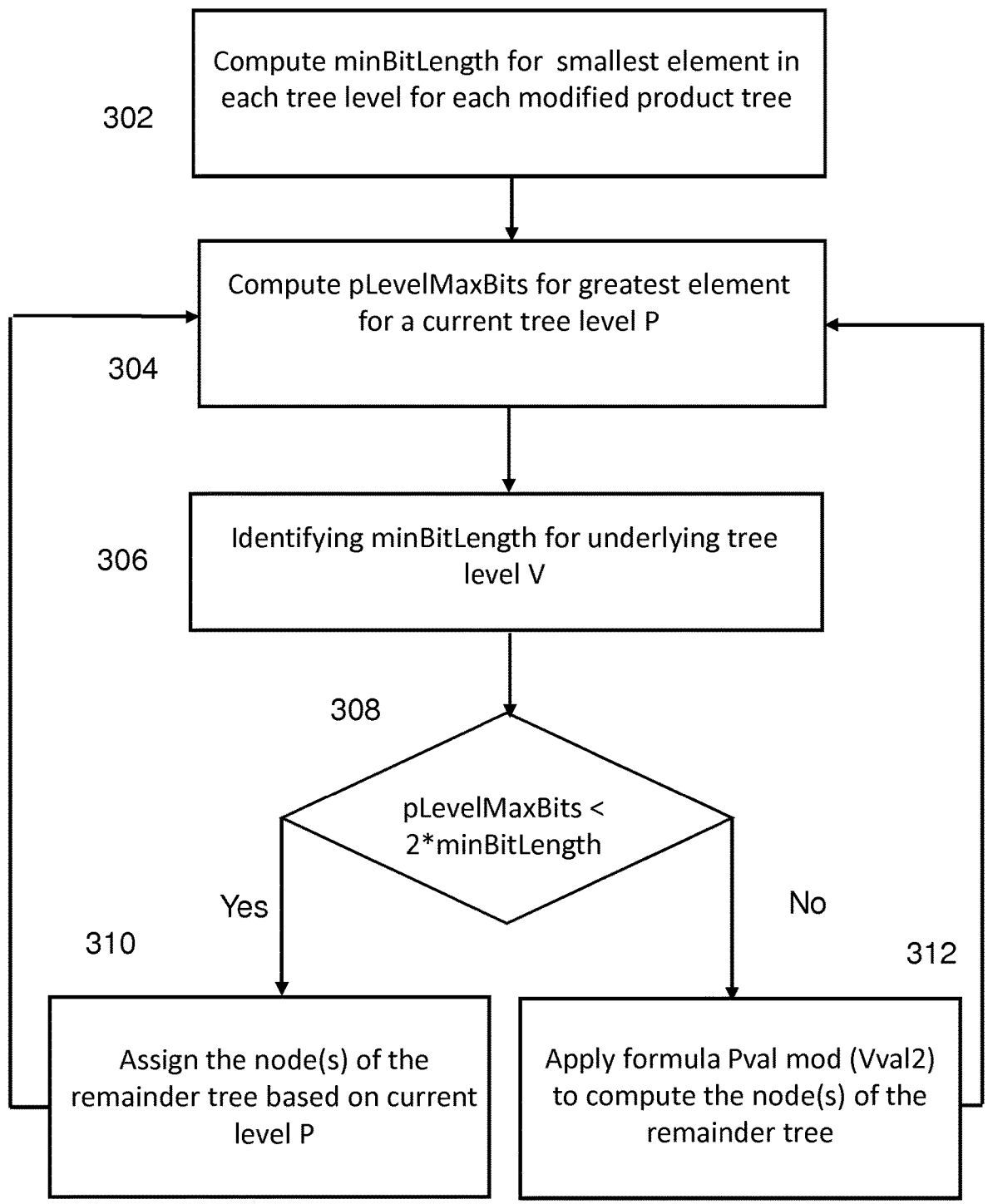
FIG. 3 is a flowchart depicting a second method of optimising the implementation of the incremental method.

In Step 302 of FIG. 3, a number of bits required to store the smallest element, i.e. value a node, for each tree level (minBitLength) of a given distinct modified product tree is computed for a given ordered pair of subsets, as set out in the disclosed method.

In step 304, a number of bits(pLevelMaxBits) required to store the greatest element (pMax) on a currently loaded tree level P of the modified product tree is computed.

In step 306, the minBitLength required to store the smallest element vMin on the underlying tree level V is identified from the computation previous performed in step 302, In step 308 pLevelMaxBits of level P is then compared to minBitLength of V, which is identified in step 306, V being underlying to the current level P. Once the underlying tree level V is identified, the minBitLingth information is loaded from a memory area, rather than the tree elements of level V.

In some embodiments, by comparing the number of bits for greatest element of P on one side with the number of bit for the smallest element of V on the other side of the inequation a<b, a worst case has been tested for all the tree elements in level P and V. Therefore, in some implementation the comparison in step 308 may be performed once for the entire tree level V.

More precisely, the values that must be compared for assessing the number of bits are, the greatest element on a current tree level P, and the square of the smallest element on the underlying tree level V. In other words, pMax should be less than vMin^2, where P and V are the respective levels. Thus, in step 308, for comparing the number of bits, pLevelMaxBits<2*minBitLength is to be evaluated.

For example, consider the computation for (S3, S1) as discussed in Example #3 above again to explain the second optimisation. In this example, it is assumed that the smallest element's number of bits has been computed beforehand for each tree level of each modified product tree as given in step 302. The following can then be obtained for the product tree of S3, S1:
For S1,
 [6, 15, 77, 143]→smallest element=6→log 2(6)=2.584962500721156
 [90, 11011]→smallest element=90→log 2(90)=6.491853096329675
 [990990]→smallest element=990990→log 2(990990)=19.918510973802967

The number of bits for each of the above is obtained by taking log 2 of its value, which is number of required bits to store the smallest value and save that number of bits so that it can later be read during computing the relative remainder tree step using the second optimisation.

First, the relative remainder tree of (S3, S1) is computed by the below steps:
First Iteration:
 Level P=from S3
 Level V=from S1
 In Example #3 1147 mod (990990^2) is computed, however for the second optimisation, instead of loading the whole [990990] tree level, the smallest element's number of bits is loaded instead. This is 19.918510973802967, as given in step 304

Then, as given in step 308, the greatest element of the upper tree level of the modified product tree for S3, S1 is found [1147], which is 1147, and its number of bits is computed by log 2(1147)=10.163649676015824

Now, as per step 308 10.163649676015824 (number of bit for pMax)<2*19.918510973802967 (number of bit for vMin) is evaluated: In this example the result is True.
Second Iteration:
In step 310, given that the above outcome is true, it is possible to infer that that the lower tree level does not need to be loaded from memory for processing, and the remainder tree elements for the next level P_next can be simply assigned as [1147], before proceeding to the next iteration, so P will be exactly the same as P_next for this next iteration.
Third Iteration:
For the next tree level of remainder tree S3, S1, the same as above happens for the second time for both elements on this level Accordingly, it is possible to forward the values to the next level P_next to obtain [1147, 1147].
Last Iteration:
On this level, it is required to compute 1147 (level P) mod 6^2 (level V) to obtain the first element of the output (there are 4 elements to be computed). The greatest element from the current level P is 1147, and log 2(1147) =10.163649676015824.

The number of bits of the smallest element from the underlying level V (which is 6) is equal to 2.584962500721156.

The evaluation of 10.163649676015824<2*2.584962500721156 is now False.

As seen in step 308, if the result of pLevelMaxBits<2*minBitLength is False, then the conclusion is reached that the second optimisation cannot be performed in this situation.

Accordingly, as shown in step 312, the lower tree level V of the modified product tree should be loaded from memory, so that the P_next=Pval mod (Vval^2) can be computed, by computing the modulo and the square to obtain the result for the first element of the relative remainder tree, i.e. 1147 mod 6^2=31.

In Example #5, for the modified product tree of S3, S1 the second optimisation cannot be performed for the second element on this current tree level, but it can be performed for the third and the fourth. The result for this iteration is [31, 22, 1147, 1147]. After all iterations the result of the relative remainder tree is [1, 1, 1, 1], which confirms that there is no common factor for the pair of subsets S3 and S1.

Runtime test data obtained by the inventors when implementing the method according to the disclosed method in Example #3 unoptimised, the disclosed method with the first optimisation in Example #4 and then the disclosed method with the second optimisation in Example #5 have been benchmarked for incrementally testing a single new key added to a dataset, and a larger set of new keys as well.

All benchmarks were performed on a 4-machine cluster totaling 160 CPU cores. The results obtained for 279 million example integer public keys and testing new keys against those are Table #1 below.

TABLE #1

| Version | Number of new keys | Execution time | Speedup with respect to unoptimised version |
|---|---|---|---|
| Unoptimised | 1 | 107 minutes | 1× |
| Optimisation 1 | 1 | 29 minutes | 3.7× |
| Optimisation 2 | 1 | 11 minutes | 9.7× |
| Unoptimised | 1499 | 218 minutes | 1× |
| Optimisation 1 | 1499 | 90 minutes | 2.4× |
| Optimisation 2 | 1499 | 74 minutes | 2.9× |

It is seen from Table #1 that the optimisations are more effective when the number of new keys is small and can yield a total speedup of 9.7× for testing a single new key.

FIG. 5 illustrates a block diagram of one implementation of a computing device 500 within which a set of instructions, for causing the computing device to perform any one or more of the methodologies discussed herein, may be executed. In alternative implementations, the computing device 500 may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 500 includes a processing device 502, a main memory 504 (e.g., read-only memory (ROM), flash memory, dynamic random-access memory (DRAM) such as synchronous DRAM (SDRAM) or Rambus DRAM (RDRAM), etc.), a static memory 506 (e.g., flash memory, static random-access memory (SRAM), etc.), and a secondary memory (e.g., a data storage device 518), which communicate with each other via a bus 530.

Processing device 502 represents one or more general-purpose processors such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the processing logic (instructions 522) for performing the operations and steps discussed herein.

The computing device 500 may further include a network interface device 508. The computing device 500 also may include a video display unit 510 (e.g., a liquid crystal display (LCD) or a cathode ray tube (CRT)), an alphanumeric input device 512 (e.g., a keyboard or touchscreen), a cursor control device 514 (e.g., a mouse or touchscreen), and an audio device 516 (e.g., a speaker).

The data storage device 518 may include one or more machine-readable storage media (or more specifically one or more non-transitory computer-readable storage media) 528 on which is stored one or more sets of instructions 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting computer-readable storage media. The data storage device is additionally configured for storing hierarchical data structures, such as the product trees and relative remainder trees that are required for the computation of the intermediate and final output.

With reference to FIG. 6, a specific hardware implementation 600 of a system is shown, such as a cryptosystem that comprises a CPU 602, RAM 604, ROM or FLASH memory 606 (or any other suitable memory arrangement) and a plurality of (two or more) sub-processors or processing circuitry 608, 610, 612, communicating over a bus 614 or communication circuitry 616 which can also be an interface. The communications circuitry 616 can include RF circuitry 618 and/or I/O ports 620 for sending and receiving information. The RF circuitry 618 permits transmission of information over a wireless link or network to one or more other devices and includes well-known circuitry for performing this function. The port 620 permits transmission of information over a wired link. The communications circuitry 616 can communicate, with one or more other computing devices or peripheral devices.

The system hardware implementation 600 may be configured as separate isolated processor communicating over a suitable interface therewith. Alternatively, the sub-processors 608, 610, 612 and/or memory components 604 or 606 can be integrated in any other fashion in a computing device such as computing device 500 in FIG. 5.

Each sub-processor may include an operating system module 622, a communication module 624, and one or more applications 626, where each of these modules and applications correspond to a set of instructions for performing one or more functions described above and the methods described in the disclosure (e.g., the computer-implemented methods and other data or encryption/decryption key processing methods described herein).

The operating system 622 can include various procedures, sets of instructions, software components, and/or drivers for controlling and managing general system tasks (e.g., memory management, storage device control, power management, etc.) and facilitates communication between various hardware and software components.

The communication module 624 facilitates communication with other devices using the communications circuitry 616 and includes various software components for handling data received from the RF circuitry 618 and/or the port 620.

In some embodiments, the communication circuitry 616, the CPU 602 and the one or more sub processors 608, 610, 612 may be implemented on a single chip. In some other embodiments, they may be implemented on separate chips.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "creating", "providing", "calculating", "computing," "concluding", "identifying", "comparing", "establishing", "sending", "receiving", "storing", "testing", "assessing", "determining" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the disclosure has been described with reference to specific example implementations, it will be recognized that the disclosure is not limited to the implementations described but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A testing method for verifying keys, said method using a dataset of integers, the dataset being previously split into a plurality of subsets of the integers, each subset of the plurality of subsets of integers having a corresponding product data structure for a product of the integers in the subset, and each ordered pair of subsets in the dataset having a corresponding remainder data structure for factors of the integers in the subsets of the ordered pair, the method comprising:
creating a new subset including one or more integers to be added to the dataset of integers;
generating a new product data structure for the created new subset, the new product data structure being generated by computing one or more products of the one or more integers in the created new subset;
identifying distinct ordered pairs of subsets, each distinct ordered pair of subsets in the distinct ordered pairs of subsets comprising a particular subset from the dataset and the created new subset;
for each pair of the identified distinct ordered pairs of subsets, using the new product data structure and the corresponding product data structure of the particular subset, generating a remainder data structure to obtain common factors of the integers in the subsets of the pair;
determining whether each of the common factors in the remainder data structure for each of the identified distinct ordered pairs of subsets satisfy a threshold by comparing each of the common factors to the threshold;
in response to determining that each of the common factors in the remainder data structure satisfy the threshold, validating that the one or more integers in the created new subset do not have common factors with any other integer in the dataset, wherein the integers are integer public keys for encryption or decryption, each of the integer public keys is associated with a private key, and the dataset of integers is a public key testing dataset for a system; and
in response to determining that the common factors in the remainder data structure do not satisfy the threshold, generating an output indicating that the integer public keys are vulnerable to being compromised.

2. The method as claimed in claim 1, further comprising:
in response to determining that the common factors in the remainder data structure satisfy the threshold, generating an output indicating that the one or more integers in the created new subset do not have any common factor with any other integer in the dataset.

3. The method as claimed in claim 1, wherein the determining step comprises determining whether the common factors in the remainder data structure for each of the identified distinct ordered pairs of subsets is equal to one.

4. The method as claimed in claim 1, wherein the corresponding product data structure and the remainder data structure are hierarchical data structures, the product data structure indicating the product of the integers in a given subset, and the remainder data structure indicating the greatest common divisor of the integers in the subsets of each of the identified distinct ordered pair of subsets.

5. The method as claimed in claim 1, wherein the created new subset includes more than one integer, and the step of generating the new product data structure for the new created subset comprises:
   assigning the more than one integers of the created subset as leaf nodes of a binary product tree; and
   computing a root of the binary product tree by multiplying a given pair of leaf nodes to produce a respective intermediate node until the product of all the more than one integers in the created new subset is obtained as the root, and wherein the leaf nodes are a lowest level of the binary product tree and the root is an upper level of the binary product tree.

6. The method as claimed in claim 1, wherein based on an integer in the created new subset, generating the new product data structure for the new created subset further comprises assigning the integer as a leaf node as well as a root of a binary product tree.

7. The method as claimed in claim 1, wherein the step of generating the remainder data structure for each of the identified distinct ordered pair of subsets further comprises:
   obtaining a modified product tree by adding a root of the product data structure of a first subset in the ordered pair, to the product data structure of a second subset of the ordered pair; and
   generating a remainder tree for the modified product tree iteratively, starting from a root of the modified product tree.

8. The method as claimed in claim 7, further comprising:
   computing a value for each node of the remainder tree by iteratively computing Pval mod, wherein Pval mod is a value of a node in a current level P of the modified product tree and Vval is a corresponding value of a node in an underlying level V of the modified product tree.

9. The method as claimed in claim 7, wherein the step of generating the remainder tree comprises computing a value for each node of the remainder tree iteratively, and wherein for a given iteration:
   based on Pval being less than Vval, where Pval is a value of a node in a current level P of the modified product tree and Vval is a corresponding value of a node in an underlying level V of the modified product tree, assigning Pval as the value of the node of the remainder tree for a given iteration; and
   based on Pval being greater than Vval, applying formula Pval mod to compute the value of the node of the remainder tree for the given iteration.

10. The method as claimed in claim 8, wherein an output of Pval mod for a given iteration becomes a next current level P_next for a next iteration, such that the next iteration P is P_next.

11. The method as claimed in claim 7, wherein the step of generating the remainder tree further comprises:
   computing, for the modified product tree, a number of bits (minBitLength) to store a smallest node value for each tree level; and
   wherein the method further comprises:
   for the modified product tree, computing a number of bits (pLevelMaxBits) to store a greatest node value for a current tree level (P);
   identifying the number of bits (minBitLength) to store the smallest node value for an underlying tree level;
   when pLevelMaxBits is less than 2*minBitLength, assigning the value of the node(s) of the remainder tree for a given iteration based on the current tree level P; and
   when pLevelMaxBits is greater than 2*minBitLength, applying formula Pval mod (Vval$^2$), to compute the value of the node(s) of the remainder tree for the given iteration.

12. A non-transitory computer-readable medium including one or more instructions, which, when executed on one or more processors, cause the one or more processors to perform a method, comprising:
   creating a new subset including one or more integers to be added to the dataset of integers;
   generating a new product data structure for the created new subset, the new product data structure being generated by computing one or more products of the one or more integers in the created new subset;
   identifying distinct ordered pairs of subsets, each distinct ordered pair of subsets in the distinct ordered pairs of subsets comprising a particular subset from the dataset and the created new subset;
   for each pair of the identified distinct ordered pairs of subsets, using the new product data structure and the corresponding product data structure of the particular subset, generating a remainder data structure to obtain common factors of the integers in the subsets of the pair;
   determining whether each of the common factors in the remainder data structure for each of the identified distinct ordered pairs of subsets satisfy a threshold by comparing each of the common factors to the threshold;
   in response to determining that each of the common factors in the remainder data structure satisfy the threshold, validating that the one or more integers in the created new subset do not have common factors with any other integer in the dataset, wherein the integers are integer public keys for encryption or decryption, each of the integer public keys is associated with a private key, and the dataset of integers is a public key testing dataset for a system; and
   in response to determining that the common factors in the remainder data structure do not satisfy the threshold, generating an output indicating that the integer public keys are vulnerable to being compromised.

13. A computing device, including:
a memory area for storing data and instructions; and
one or more processors for executing the instructions, which cause the one or more processors to perform a method, comprising:
   creating a new subset including one or more integers to be added to the dataset of integers;
   generating a new product data structure for the created new subset, the new product data structure being generated by computing a product one or more products of the one or more integers in the created new subset;
   identifying distinct ordered pairs of subsets, each distinct ordered pair of subsets in the distinct ordered pairs of subsets comprising a particular subset from the dataset and the created new subset;

for each pair of the identified distinct ordered pairs of subsets, using the new product data structure and the corresponding product data structure of the particular subset, generating a remainder data structure to obtain common factors of the integers in the subsets of the pair;

determining whether each of the common factors in the remainder data structure for each of the identified distinct ordered pairs of subsets satisfy a threshold by comparing each of the common factors to the threshold;

in response to determining that each of the common factors in the remainder data structure satisfy the threshold, validating that the one or more integers in the created new subset do not have common factors with any other integer in the dataset, wherein the integers are integer public keys for encryption or decryption, each of the integer public keys is associated with a private key, and the dataset of integers is a public key testing dataset for a system; and in response to determining that the common factors in the remainder data structure do not satisfy the threshold, generating an output indicating that the integer public keys are vulnerable to being compromised.

14. A system, comprising:

one or more processors and one or more storage devices, the one of more storage devices configured for storing a public key testing dataset, and configured for storing instructions that are configured, when executed by the one or more processors, to cause the one or more processors to perform a method, comprising:

creating a new subset including one or more integers to be added to the dataset of integers;

generating a new product data structure for the created new subset, the new product data structure being generated by computing one or more products of the one or more integers in the created new subset;

identifying distinct ordered pairs of subsets, each distinct ordered pair of subsets in the distinct ordered pairs of subsets comprising a particular subset from the dataset and the created new subset;

for each pair of the identified distinct ordered pairs of subsets, using the new product data structure and the corresponding product data structure of the particular subset, generating a remainder data structure to obtain common factors of the integers in the subsets of the pair;

determining whether each of the common factors in the remainder data structure for each of the identified distinct ordered pairs of subsets satisfy a threshold by comparing each of the common factors to the threshold;

in response to determining that each of the common factors in the remainder data structure satisfy the threshold, validating that the one or more integers in the created new subset do not have common factors with any other integer in the dataset, wherein the integers are integer public keys for encryption or decryption, each of the integer public keys is associated with a private key, and the dataset of integers is a public key testing dataset for a system; and in response to determining that the common factors in the remainder data structure do not satisfy the threshold, generating an output indicating that the integer public keys are vulnerable to being compromised.

\* \* \* \* \*